United States Patent

[11] 3,630,235

| [72] | Inventors | Bruce A. Wiley<br>Carpentersville;<br>Chester J. Witt, Deerfield; Sigmund P. Skoli, Elmwood Park, all of Ill. |
|---|---|---|
| [21] | Appl. No. | 872,632 |
| [22] | Filed | Oct. 30, 1969 |
| [45] | Patented | Dec. 28, 1971 |
| [73] | Assignee | Mojonnier Bros. Co.<br>Chicago, Ill. |

[54] HYDRAULIC SHOCK DAMPENER
2 Claims, 3 Drawing Figs.

[52] U.S. Cl. .................................................. 138/31
[51] Int. Cl. .................................................. F16l 55/04
[50] Field of Search .......................................... 138/31;
137/624.14; 91/392, 403, 415

[56] References Cited
UNITED STATES PATENTS

| 611,823 | 10/1898 | Steier | 138/31 |
| 1,908,504 | 5/1933 | Bone | 91/415 X |
| 2,934,025 | 4/1960 | Wilson | 138/31 X |
| 3,085,556 | 4/1963 | Peczkowski et al. | 91/415 X |
| 3,494,376 | 2/1970 | Doeringsfeld et al. | 137/624.14 |

*Primary Examiner*—Laverne D. Geiger
*Assistant Examiner*—Richard J. Sher
*Attorney*—Olson, Trexler, Wolters & Bushnell ABSTRACT: A hydraulic shock dampening device for use in fluid lines where changes in direction of the fluid flow are to be induced. The device includes a body member having a fluid passage therein defined by intersecting inlet and outlet branches, and a retractable piston member disposed proximate the intersection of said branches and coaxial with the inlet branch such that fluid entering the body will impinge initially upon said piston with said piston retracting to absorb the hydraulic shock thus produced. The device further includes control means for maintaining the initial position of said piston irrespective of the pressure of the fluid in said line.

PATENTED DEC 28 1971

3,630,235

Inventors
Bruce A. Wiley
Chester J. Witt
Sigmund P. Skoli
By: Olson, Trexler, Wolters & Bushnell   Attys.

HYDRAULIC SHOCK DAMPENER

BACKGROUND OF THE INVENTION

The present invention relates to fluid lines. More particularly this invention is concerned with means disposed in said lines at locations where a change in direction of the fluid is accomplished to absorb or dampen the initial shock produced when fluid under pressure is introduced into said lines.

The liquid pipeline systems used in conjunction with processing apparatus such as those found in dairy plants, or the like, employ numerous sections of tubing interconnected to define a closed system. Generally, the conveyance of the liquid from one station to another requires that the pipeline traverse a rather tortuous path, with numerous elbow joints being employed to accommodate for changes in direction. Since during normal operation the pumps which supply the liquid to the pipeline must work against the resistance of the line and that of the apparatus, the force with which the fluid is initially introduced into the line is extremely high. Thus, at each of the locations where a change of direction is effected, the fluid entering the elbow must impinge upon the body structure thereof before being diverted toward the outlet branch. This engagement of the elbow body by the fluid results in severe hydraulic shock, which is noisy and damaging to the fluid couplings.

Accordingly, the present invention provides an improved dampening device that can be employed at selected locations in a fluid system to accommodate the initial hydraulic shock produced where a change in the direction of the fluid must be effected. In addition, the device of the present invention provides control means whereby a continuous dampening effect can be realized irrespective of increases or decreases of the operating pressure in the fluid line, or the intermittent use thereof.

DESCRIPTION OF THE ILLUSTRATED EMBODIMENT

Figures 1, 2:
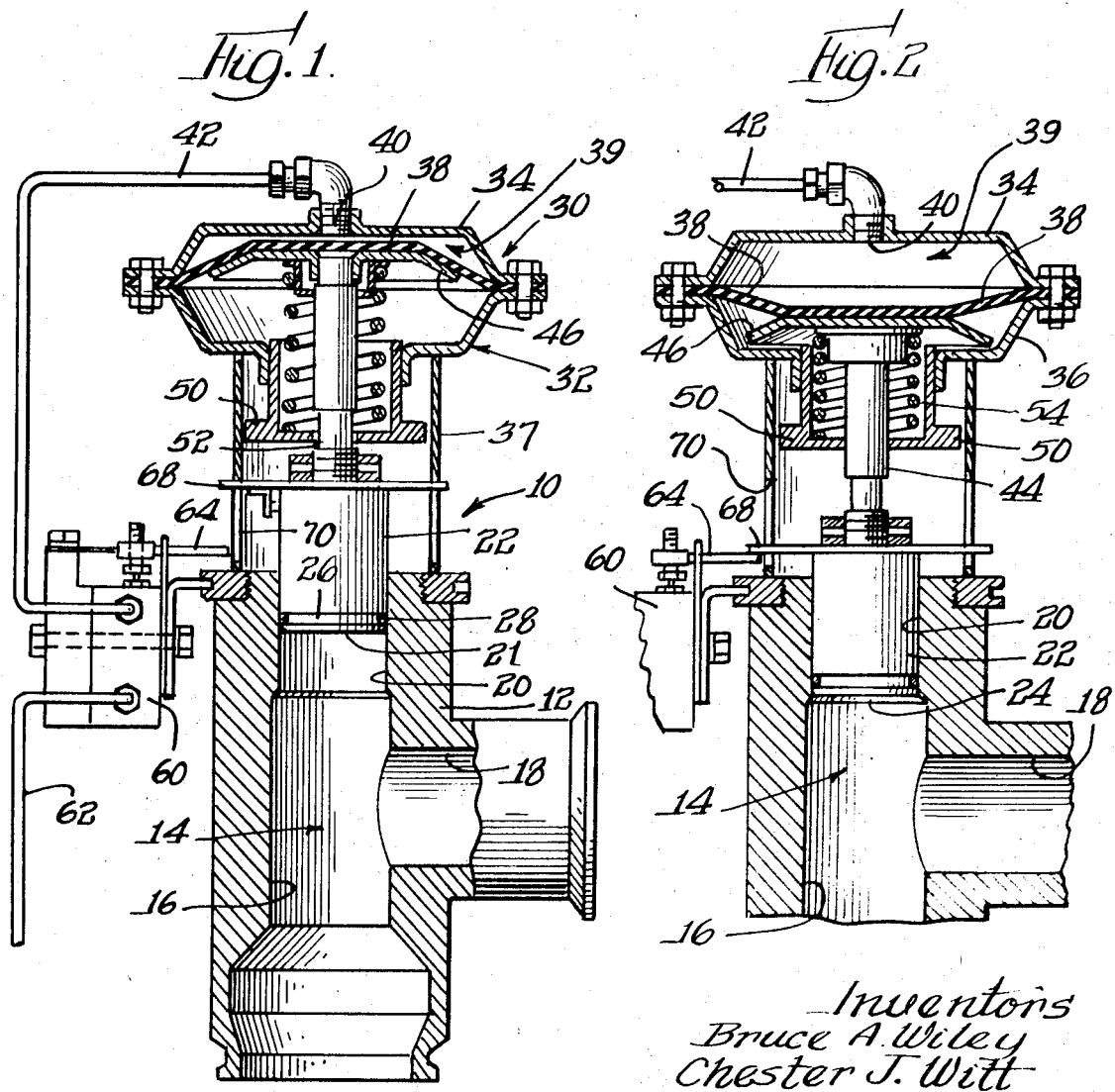
FIG. 1 is a partial sectional view illustrating the dampening device of the present invention, with the hydraulic shock absorbing piston member in the retracted position; and also showing one form of control means.
FIG. 2 is a fragmentary, partial sectional view illustrating the device of FIG. 1 with the shock-absorbing piston member in the operating position.

Referring now in detail to the drawings, in FIG. 1 there is illustrated the dampening device of the present invention, which is designated generally 10. It is to be understood that the device 10 is to be connected in a fluid line (not shown) so that changes in direction of the liquid product being transported can be handled readily without severe hydraulic shock.

The device 10 is comprised of a body member 12 having an internal fluid passage 14 defined by the intersecting inlet and outlet passages 16 and 18. In addition, the body 12 includes a port or opening 20 coaxially aligned with the inlet passage 16 and merging therewith proximate the intersection of said passage 16 with passage 18.

A piston member 22 is disposed within the port 20 such that said port may be viewed as defining a piston chamber. Thus, with the port or chamber 20 coaxially aligned with inlet passage 16, the operating face 24 of the piston will be positioned so that the fluid entering body 12 will impinge directly thereupon, tending to retract or force the piston outwardly of said chamber.

An annular groove 26 is formed in the piston proximate the operating surface 24. Within groove 26 there is disposed a packing member 28 which sealingly engages the walls of the chamber 20 so as to prevent the escape of fluid outwardly past the piston member 22.

For the dampening device 10 to accommodate or absorb the hydraulic shock created during a change of direction of the fluid passing through body 12, it is necessary to provide resilient biasing means which tend to return the piston 22 to its initial operating position. In this regard, a liquid or air-operated diaphragm arrangement 30 is employed, which is operably connected to the piston 22 and, as will be explained hereinafter, continuously urges said piston inwardly of the body 12 to the operating position of FIG. 2.

The diaphragm assembly 30 is mounted proximate the piston chamber 20 and includes a housing 32 defined by an upper cover section 34 and a lower annular section 36. The respective sections 34 and 36, which form housing 32, are maintained in position by a cylindrical support member 37. Interposed between the sections 34 and 36 is a diaphragm member 38 which cooperates with the upper housing section 34 to define a chamber 39 into which operating fluid may be directed. An inlet port 40 is provided in the upper housing 34, which is connected with a conduit 42 that leads to a source of operating fluid. Thus, by the controlled introduction and removal of operating fluid to and from chamber 39, the diaphragm 38 can be flexed toward or away from the body 12.

The diaphragm 38 is operably connected to piston 22 by means of a piston rod 44 and a backing plate 46. The piston rod 44 is fixedly attached to backing plate 46, which in turn is in contiguous contact with the diaphragm 38. Thus, referring now to FIGS. 1 and 2, when operating fluid is introduced into chamber 39 to flex the diaphragm 38 toward the body 12, this flexing results in movement of the piston 22 from the position illustrated in FIG. 1 to that of FIG. 2.

In addition to the sections previously discussed, housing 32 also includes an annular cup-shaped guide element 50 which is connected to the lower annular housing portion 36. The guide 50 has an aperture 52 formed in the lower portion thereof through which the piston rod 46 passes. Disposed intermediate the backing plate 46 and the bottom wall of the guide member 50 is a spring element 52. Thus, due to the relatively fixed position of the guide 50, the spring 54 will tend to bias the backing plate 46 and the associated diaphragm 38 to the position illustrated in FIG. 1, with the piston 22 retracted to its uppermost point relative to the chamber 20. In dairy processing lines, complete cleaning or cleansing must be done numerous times throughout the day. Accordingly, for efficient operation this must be accomplished without breaking down the entire fluid lines, a procedure referred to in the art as "clean-in-place." With the spring 54 retracting piston 22 upon depressurization of the diaphragm chamber 39, any cleaning operation may be readily accomplished without dismantling the device 10.

Turning now to FIG. 2, there is illustrated the disposition of piston 22 at its inwardmost limit, and that which is maintained upon pressurization of the diaphragm chamber 39. Accordingly, when fluid enters the inlet passage 16 it will impinge directly upon the operating surface 24 of said piston. The force or shock created by this engagement is accommodated by retracting or rearward movement of the piston 22 relative to chamber 20. This retracting movement of the piston 22 is reflected in the simultaneous partial collapse or flexing of the diaphragm 39 toward the upper housing section 34, which causes operating fluid to be removed or expelled from chamber 39. In order to accommodate the removed or expelled operating fluid, and the inherent increase in line pressure produced thereby, a pressure relief valve or device, (not shown) is shown with the supply line for chamber 39. However, for the most effective operation, it is desired to maintain the piston 22 in its initial position while providing for the aforementioned resiliency and shock-absorbing characteristics of the device. Accordingly, to counteract the force on the operating face 24 of the piston, control means are provided which adjust the pressure in the diaphragm chamber accordingly so that irrespective of the shock absorbed by the piston it will be returned to its initial operating position, as shown in FIG. 2.

Another feature to be noted is that the area of piston face 24 is considerably less than that of diaphragm 38. Thus, while a line pressure of 400 or 500 pounds may be encountered in passage 14, this can be offset by an operating fluid pressure of 30 to 50 pounds, depending on the area differential. Further, it will be appreciated that the area or size of diaphragm 38 can be adjusted to accommodate varying line conditions.

One embodiment or form of control means contemplated is illustrated in conjunction with FIGS. 1 and 2. This embodiment, which is self-regulating, is best viewed with reference to FIG. 1. More specifically, the supply line 42 for the actuating fluid is connected to a valve assembly 60 which is in turn connected to a source or supply of actuating fluid under pressure by means of a line 62. The valve 60 includes an operating arm 64 which is disposed as illustrated. The piston 22 has a trip plate 68 mounted thereon and movable therewith. The housing section 37 has a slot 70 formed therein so that the plate 68 may extend radially outward from said housing to engage the operating arm 64, as is shown in FIG. 2.

When the operating arm 64 is engaged by the trip plate 68 the valve 60 is in the closed position and the supply of operating fluid to chamber 39 ceases. However, upon the absorption of hydraulic shock by the piston 22 it will tend to move outwardly of the chamber 20, thus disengaging the plate 68 from the operating arm 64, as shown in FIG. 1. This disengagement opens the valve 60 and permits operating fluid to enter the chamber 39 to expand the diaphragm 38 and return piston 22 to its initial position. As the piston 22 approaches its initial position, it will again engage the operating arm 64 to close the valve 60 and terminate the supply of operating fluid to chamber 39. Thus, it can be seen that there is provided a continuous modulating effect, which maintains the piston 22 in the position illustrated in FIG. 2.

Figure 3:
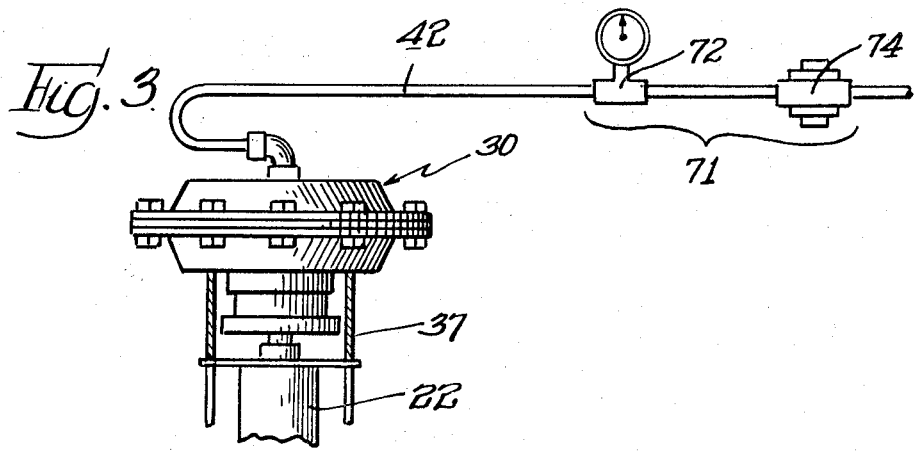
FIG. 3 is a fragmentary, elevational view of an alternate form of control means for the device of FIG. 1.

The action of the control means illustrated in FIGS. 1 and 2 is self-regulating, in that movement of the piston 22 induces or initiates the supply of fluid to the chamber 39. In FIG. 3 there is illustrated an alternate form of control means that may be employed with the present invention.

In this regard, the basic overall construction of the body member 12, the piston 22 and the diaphragm assembly 30 is the same as discussed hereinbefore. However, the valve 60 and operating arm 64 which is engaged by the trip plate 68 are replaced by a regulator arrangement designated generally 71. The regulator arrangement 71 includes a gauge 72 and a control regulator valve 74 which can be adjusted to maintain a constant operating pressure in the diaphragm chamber 39 sufficient to accommodate the fluid pressure encountered in the passage 14. With this embodiment, adjustment of the control means to accommodate changes in the operating pressure must be handled manually by changing the setting of the regulator valve 74.

The principles of the invention described hereinabove may be embodied in numerous modifications and adaptations. It is accordingly to be understood that the present invention is not limited to the particular embodiment illustrated and described, or the particular usage and environment set forth, as those skilled in the art may effect numerous changes and substitutions without departing from the spirit and scope of the invention.

The invention is claimed as follows:

1. A hydraulic shock dampening device for use in fluid lines, and comprising: a body member having an internal fluid passage defined by transversely disposed, intersecting inlet and outlet branches, and a piston chamber communicating with said internal fluid passage and being coaxially aligned with said inlet branch; a piston member disposed in said piston chamber such that fluid passing through said body member will impinge upon the operating surface of said member wherein said piston will be retracted from its initial position relative to said body to absorb and dampen the shock created by the fluid engaging said operating surface; a diaphragm assembly mounted to said body member and including a housing and a diaphragm member cooperating with said housing to define a chamber for operating fluid, said diaphragm member being operably connected to said piston such that the introduction of operating fluid to said chamber will flex said diaphragm to bias said piston inwardly of said chamber to an initial desired position; and control means for regulating the supply of operating fluid to said diaphragm chamber so that the piston can accommodate and absorb hydraulic shock, but will be returned to its initial position upon the introduction of operating fluid to said chamber, said control means including valve means connected with said supply line and having an operating arm the operation of which effects opening and closing of said valve, and a trip plate carried by said piston and engageable with said operating arm to maintain the valve in the closed condition when said piston is in the initial operating position, whereby retractive movement of said piston upon engagement by the fluid passing through said body member will disengage said trip plate from the operating arm to open said valve and permit operating fluid to be supplied to said diaphragm chamber which flexes said diaphragm to return said piston to its initial position.

2. A device as defined in claim 1, further including spring means tending to flex said diaphragm sway from the body member such that when said diaphragm chamber is depressurized the piston will be retracted to permit effective cleaning of the piston chamber.

* * * * *